FTDF102 XR 3,694,579

TX ... -3R
BS
X5624T
X5186T

United S...
McMurray

[15] 3,694,579
[45] Sept. 26, 1972

[54] EMERGE... COMMUNICATIONS SYSTEM

[72] Inventor: Peter H. McMurray, 161 Bay Ave., Islip, N.Y. 11751

[22] Filed: Aug. 6, 1971

[21] Appl. No.: 169,737

[52] U.S. Cl. ....................179/5 R, 179/2 DP, 179/2 E, 179/41 A

[51] Int. Cl. ....................H04m 11/04

[58] Field of Search...179/1 C, 1 VE, 2 C, 2 DP, 2 E, 179/5 R, 6 C, 15 BZ, 41 A; 325/16

[56] References Cited

UNITED STATES PATENTS

| | | | |
|---|---|---|---|
| 2,719,188 | 9/1955 | Pierce | 179/15 BZ |
| 3,634,627 | 1/1972 | Velentini | 179/41 A |
| 3,647,973 | 3/1972 | James | 179/2 DP |
| ... | | Nelson | 179/2 E |

*Primary Examiner*—Ralph D. Blakeslee
*Attorney*—Paul J. Sutton

[57] ABSTRACT

A digital communications system which can be used for emergency reporting having a transmitting unit which sends out information signals identifying the transmitting unit and identifying the type of emergency. A relay station located within the area receives and stores the signal and in response thereto electronically dials a predetermined telephone number to a data center, transmits an encoded signal identifying the station and then relays the information sent from the transmitting unit. Assistance or corrective action may then be provided by dispatch from the data center.

20 Claims, 9 Drawing Figures

3694579
OR IN 179/5R

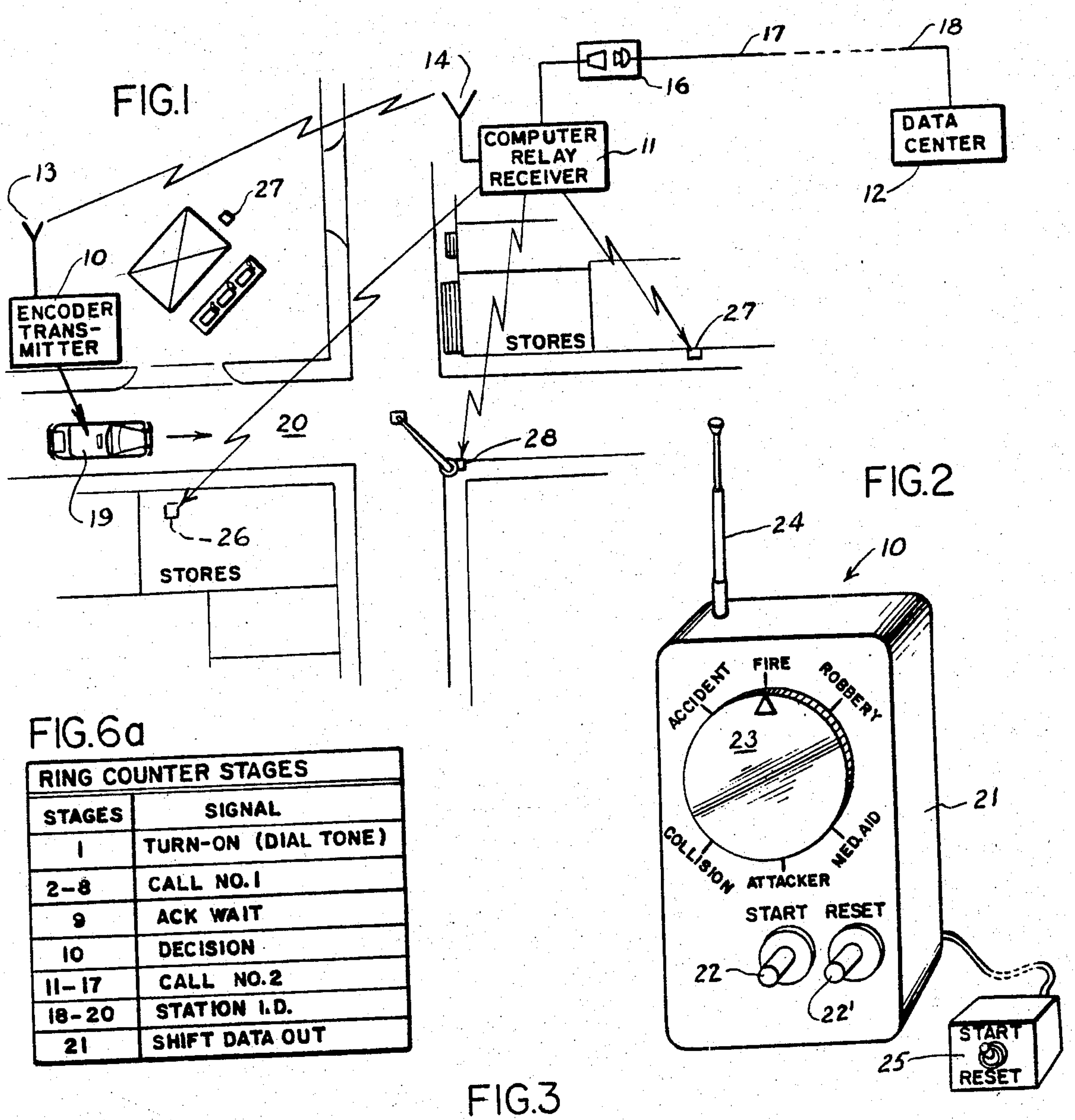
FIG.1, FIG.2
FIG.6a
| RING COUNTER STAGES | |
|---|---|
| STAGES | SIGNAL |
| 1 | TURN-ON (DIAL TONE) |
| 2-8 | CALL NO.1 |
| 9 | ACK WAIT |
| 10 | DECISION |
| 11-17 | CALL NO.2 |
| 18-20 | STATION I.D. |
| 21 | SHIFT DATA OUT |
FIG.3
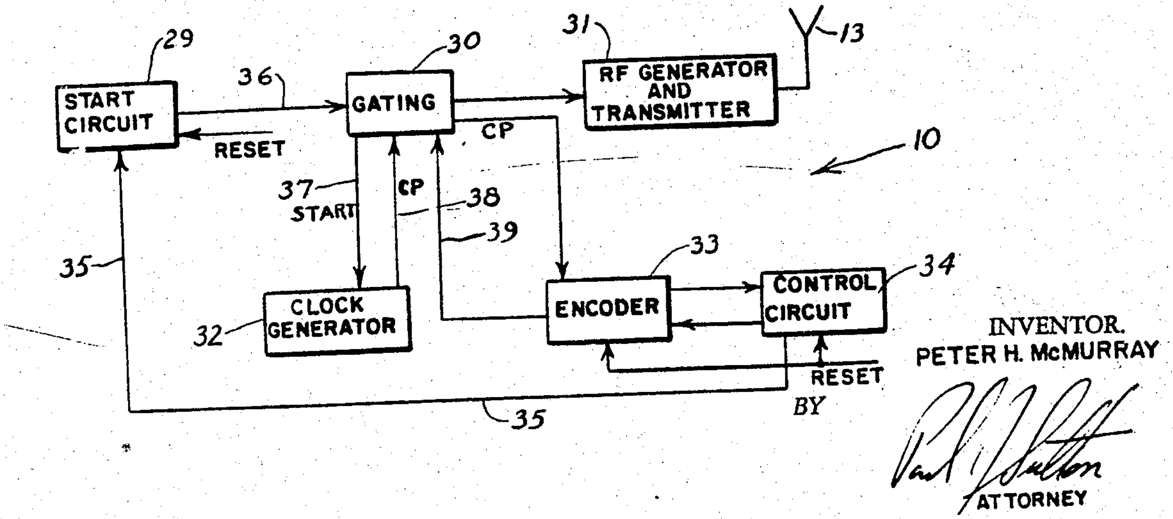
INVENTOR.
PETER H. McMURRAY
BY
ATTORNEY INVENTOR.
PETER H. McMURRAY

BY

ATTORNEY

INVENTOR.
PETER H. McMURRAY

BY [signature]

ATTORNEY

INVENTOR.
PETER H. McMURRAY

BY

ATTORNEY

INVENTOR
PETER H. McMURRAY

BY

ATTORNEY

EMERGENCY REPORTING DIGITAL COMMUNICATIONS SYSTEM

This invention relates to a digital communications system, and more particularly to a time sharing emergency identification and location system for identifying the type of emergency occurring to a system user and the identification and location of the user.

BACKGROUND OF THE INVENTION

Many applications require that services be provided from a central dispatch station to users in the field. Civil governments responsible for the health and welfare of communities provide police, ambulance and fire assistance. Vehicles and employees of these service units who tour the community encounter emergency situations requiring the assistance of others and must quickly communicate with a central dispatch office for such assistance. For example, a police car detecting a crime and requiring assistance must contact the central dispatch, identify itself, give its location and describe the emergency situation. Similarly, foot patrolmen meeting emergency situations must contact their headquarters for assistance. In addition to emergencies, these patrol units must frequently call into their headquarters merely to identify themselves and establish their location in case another patrol unit nearby may need assistance.

As the responsibility of the governments expands to provide protection for other services, the communications problem becomes more complex. Taxi drivers meeting emergencies must immediately contact the police. Also, conductors on mass transportation systems have communication means to keep the police informed of emergencies and other problems. Even store keepers insist on maintaining a private direct communications link with police and fire units to obtain immediate assistance at the occurrence of an emergency.

In addition to civil governments, private corporations may also need a communication system between its employees or customers and a central station. Delivery or repair companies require information on the location of its employees, and hospitals need to know the whereabouts of their medical specialists. Similarly, military installations require constant information from their patrol units and immediate notification of emergency situations.

While there are numerous communications systems available, because of the generally large number of individual users reporting to the central station, most of the successful systems are computerized and use digitally encoded information. By using digital communications techniques, the prior art systems however, require many transmission installations which result in a costly and complex system. Furthermore, to send the digital information, the user must punch holes or type messages which require a long time delay. A taxi driver involved in a robbery must instantly receive assistance. Also, the physical movements of the driver must be minimal to avoid the assailant realizing that help is being summoned. A further problem with existing systems occurs when a vehicle is in an emergency but is continuing its movement. During the robbery of a taxi, the assailant may want the taxi to continue in motion to avoid suspicion. The taxi driver communicating with the central police dispatch will not be able to give any fixed location because of his constant movement.

It is therefore an object of this invention to provide a digital communications system between a plurality of users and a central computer station.

Another object of this invention is to provide an emergency time shared digital communications system.

A still further object of this invention is to provide a digital communications system having a digital transmitter, a digital relay receiver and a data center.

Yet another object of this invention is to provide a digital communications system wherein the transmitter is a portable unit.

A still further object of this invention is to provide a digital communications system wherein there is a relay receiver which can receive digital information from a plurality of transmitters and which relays the information to a data center by means of standard telephone equipment.

Another object of this invention is to provide a digital communications system wherein the transmitter has a single switch which when closed continuously transmits information identifying the transmitting unit and an emergency code.

Still a further object of this invention is to provide a digital communications system having a plurality of relay receivers each sequentially receiving the same digital signal from a continuously moving transmitter.

Yet another object of this invention is to provide a digital communications system which transmits to a central computer station information identifying the user, the location of the user and an emergency condition encountered by the user.

Still another object of this invention is to provide a digital communications system having a transmitter which communicates to a relay receiver through air waves and the receiver relays the information to a central computer by automatically dialing a prearranged telephone number.

Still a further object of this invention is to provide a digital communication system where the transmitted information is continuously sent to a data center until an acknowledgement is returned to the sending unit.

BRIEF DESCRIPTION OF THE INVENTION

Briefly, this invention consists of an encoder-transmitter (E-T) which can be easily carried and contains electronic equipment to provide a digital turn-on signal, and further includes data storage registers containing a plurality of emergency codes and a user identification number. The unit is controlled by a switch for selecting the particular emergency code and a start button. The start button can be automatically connected to the most frequently occurring emergency code to avoid necessitating the setting of the separate switch. The digital turn-on signal and the data information modulate a radio frequency carrier wave which is transmitted to a computer relay receiver (CRR). The CRR, which is tuned to the frequency of the E-T, accepts the turn-on signal and the data, and in response to it electronically dials a predetermined number. It then sends over the telephone lines to own station identification number followed by the received data to a data center. The data center typically has a digital computer, a printer and a display device.

At the data center, an operator can read the computer output and in response to the particular emergency decoded dispatch the necessary assistance. Alternatively, the computer can be programmed to automatically dispatch the corrective aid.

A plurality of concealed start buttons or switches can be provided with the E-T to ensure that, should operation of one of the start buttons be apparent to the assailant, a different button could be secretly activated.

The CRR can be prearranged such that after it electronically dials the predetermined telephone number, it waits until it receives an acknowledge signal response. If busy signals are received, a second predetermined number will then be electronically dialed. Having two available numbers makes the possibility of a repeated busy signal very remote.

The CRR units are generally placed in selected positions throughout the area to be monitored and spaced to appropriately cover the entire area. They are each interconnected to a telephone unit. Because of their small size they can conveniently be placed in a public telephone booth and electronically interconnected to the telephone lines. In the event that the emergency occurs in a vehicle having an E-T unit and the vehicle is kept moving, the E-T continually transmits the entire message until stopped manually. This allows each CRR along the moving path to receive the transmitted message which will be sequentially transmitted to the data center. A pattern, tracing the path of the vehicle is then evident at the data center.

Each CRR is electronically constructed with a frontend lockout circuit such that if a second emergency from a second E-T be directed to the same CRR immediately following the first, the first priority data will not be destroyed. At the end of the lockout time, the front-end is enabled and the next message is accepted.

Because each E-T has its own unique identifying code, in the event that one should be stolen for the purpose of jamming the overall system, as soon as the unauthorized user would depress the start button, the identification number of the unit and its location would be received at the data center. It would then be recognized by the computer or by the operator as a stolen E-T. The unit could then be recovered and the unauthorized user apprehended.

This system could be further expanded to receive verbal and visual information in conjunction with the digital transmission. Also, for confidential use, the digital information could be enciphered using any known technique. Furthermore, the frequency of the system could be changed at regular intervals to further avoid detection and unauthorized monitoring.

BRIEF DESCRIPTION OF THE DRAWINGS

The above features and objects of the invention will be hereinafter described in conjunction with the accompanying drawings in which:

FIG. 1 is a pictorial representation of a typical application of this invention including a diagram of the general system;

FIG. 2 is a drawing of a preferred embodiment of an Encoder-Transmitter Unit in accordance with this invention;

FIG. 3 is a functional block diagram of a preferred embodiment of the Encoder-Transmitter Unit of this invention;

FIG. 6a is a chart useful in explaining the operation of FIG. 6;

DETAILED DESCRIPTION OF INVENTION

Figure 4:
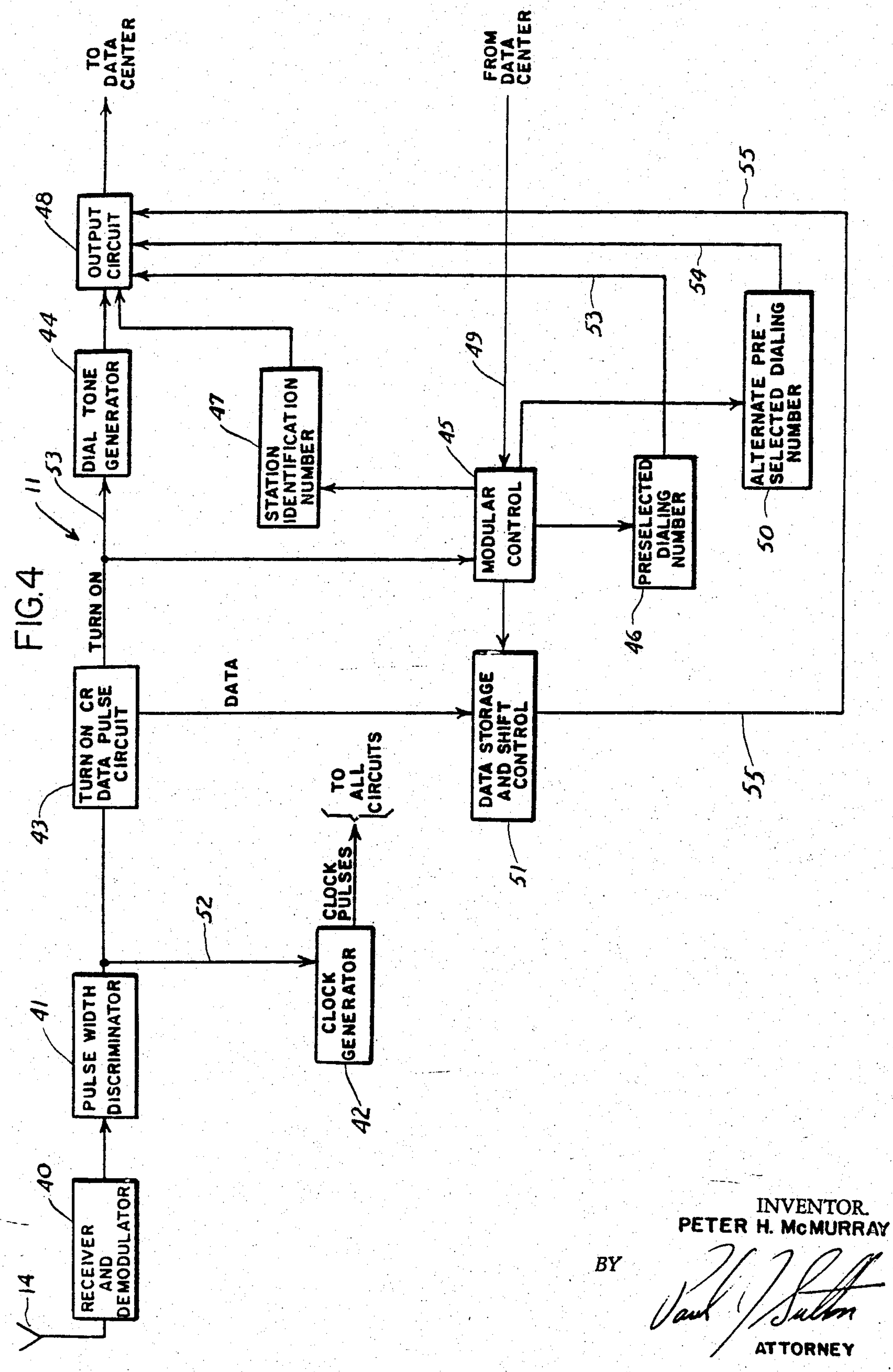
FIG. 4 is a functional block diagram of a preferred embodiment of the Computer Relay Receiver Unit of this invention.

Referring to FIG. 1, there is shown a general block diagram of the system of this invention and a typical operation of the system. Broadly, the system consists of an Encoder-Transmitter Unit (E-T) 10, a Computer Relay Receiver Unit (CRR) 11, and a data center 12. The E-T is carried by the user, either an individual or a vehicle. It contains electronic equipment which emits a turn-on signal when a start button is energized. It also has a storage register which contains a digitized identification number, and also, a coding scheme which selects a particular emergency code corresponding to the type of emergency selected by the user. This information is modulated onto an RF carrier wave and transmitted from a transmitter 13. The modulated carrier wave is received by receiver 14 on the CRR and demodulated. The CRR then electronically dials a predetermined number through a standard telephone unit 16. The CRR 11 then sends onto the telephone lines 17 a station identification number identifying the CRR and then relays the identification number of the E-T and the coded emergency signal.

The data is transmitted along a standard telephone communication medium 18 to the data center 12. The medium 18 can be either telephone cables, air waves or even laser beams. The information is decoded at the data center 12 where corrective action may be taken. This corrective action may be the dispatch of a radio car or ambulance or other assistance. A human operator can be stationed at the data center to effect the dispatch or, alternatively, the computer may be directly connected to the assisting services and automatically dispatch the aid.

Typically, the user may be a taxi 19 moving along a street 20 as shown in FIG. 1. Mounted on the car panel would be an E-T unit 10. The unit could also be carried on the person of the taxi driver himself. A typical E-T embodiment is shown in FIG. 2. The unit has a case 21 the size of a cigarette holder and made of a sturdy material. As shown, it could be carried by an individual, however, mounting tabs could be provided for permanent secretive installation onto a vehicle. The E-T unit has a start button 22 mounted onto the front of the unit for initiating operation of the E-T unit. The button could be replaced by any other type of transducer or switch. Also mounted on the front of the unit is a selector dial 23 which can be rotated to any of the stop positions on the circumference of the dial. At each stop position a particular type of emergency situation is inscribed, e.g., robbery, fire, accident, traffic, collision, etc. The user rotates the dial 23 to select the particular emergency encountered and then switches the starter button. In the normal manner of operation the particular type of emergency to be expected, such as a robbery, may be preselected such that no manual intervention is required. The dial is connected to a central circuit which selects the particular code to be transmitted. The dial could be replaced by other types of selection devices including a plurality of buttons, an indicator wheel, etc. The encoded information is modulated onto a carrier and is transmitted from antenna 24. The unit is energized from a portable power supply included within the unit such as a miniature battery. If the unit is mounted onto a vehicle, the standard vehicle antenna could be used for transmission, and the vehicle battery would be available for supplying the power to the device.

In addition to the starter button 22 which is mounted onto the panel, an additional switch 25 can be provided in parallel with the button 22. The switch 25 can be placed in a hidden position such as on the car floor adjacent to the foot pedals. In the event of a robbery, the assailant may be carefully watching the movements of the driver, and any obvious motions to energize the starter button might provoke the assailant. The alternate switch 25 can be secretly activated without the knowledge of the assailant and trigger the E-T unit. More than one such alternate switch could be provided to insure that the unit be inconspicuously triggered.

A reset button 22' is included on the panel which must be used to stop the E-T from transmitting. In the absence of manually resetting, the E-T will continue transmitting. Alternately, switch 25 could be a double pole switch such that when placed in its off position, a reset pulse is triggered.

Referring again to FIG. 1, individual CRR units 11 are placed along the street at convenient locations and each connected to a standard telephone line. Typically, these may include a store telephone 26, a public telephone booth 27 or a fire alarm box 28. The CRR units 11 are distributed over the territory to be covered to provide adequate reception from all E-T units.

Should the taxi 19 be involved in a robbery, for example, the driver would depress one of the start buttons which would energize the E-T unit and transmit the emergency signal. The E-T unit continues to transmit signals until it is manually reset. The emitted signal is received by the nearest CRR unit which then electronically dials the predetermined number on the telephone unit and connects via the telephone lines to the data center 12. The CRR transmits its identification number, thereby providing the computer with its location, and the E-T identification number, thereby identifying the vehicle being attacked. Also, the type of emergency is relayed such that police cars can be rushed to the exact location to aid the taxi driver. It is quite probable that within one minute, a police car will be at the scene of the robbery.

If the taxi continues moving during the robbery, the E-T which is continuously emitting signals, will sequentially transmit to successive receivers. For example, if the taxi is traveling along the street in the direction shown by the arrow, the information will be relayed to the data center successively by CRR's 26, 28 and 27, in that order. The computer will easily be able to trace the path of the vehicle and dispatch assistance accordingly.

FIG. 3 shows a functional block diagram of one embodiment of the E-T unit 10 of the invention. As indicated, start circuit 29 is connected through proper gating circuits 30 to an RF generator and transmitter 31 which transmits signals through antenna 13. Signals passing through the gating 30 also initiate a clock generator 32 which sends clock pulses (CP) through gating 30 to encoder 33 which then, in conjunction with control circuit 34 sends the data signals to the RF generator and transmitter 31 through the gating circuit 30. The system continues to operate until it is reset by manually providing a reset pulse to the encoder 33, control circuit 34 and start circuit 29.

The operation of the E-T of FIG. 3 is as follows: In the initial or reset condition, an enabling signal is constantly provided from the control 34 to the start circuit 29 along line 35. When the starter button is closed within the start circuit by the user, the start circuit 29 is activated, generating a turn-on pulse on line 36 which, through gating 30, modulates a carrier signal from RF generator 31 which is then transmitted from antenna 13. The turn-on signal is also gated on line 37 to enable the clock generator 32 which then emits clock pulses (CP) on line 38. The pulses, through gating 30 strobe the encoder 33.

The control 34 is connected to a selector dial on the E-T unit and as a particular emergency is selected, the proper emergency code is set by having the control circuit 34 address a particular decoder within the encoder 33. The control circuit 34 also addresses the encoder 33 which, in turn, generates the identification code which uniquely identifies the particular E-T unit.

As the encoder is strobed by the clock pulses, data is generated on line 39 which represents the identification number and the emergency code. This data is routed, through gating 30, to the RF generator 31 where it pulse-width modulates the carrier signal and is then transmitted from antenna 13.

The E-T is fixed such that the data will continue to be transmitted until the system is reset. After being reset, the control circuit 34 again enables the start circuit 29 to receive a new start signal.

FIG. 4 shows a functional block diagram of one embodiment of the Computer Relay Receiver. The CRR is comprised of an antenna 14 which picks up the signal from the E-T. The signal is sent to a receiver and demodulator unit 40 and then passes to a pulse width discriminator 41. The output pulses turn on clock generator 42 which provides clock pulses to control all the circuits in the CRR. The data output is then divided by circuit 43, with the turn-on signal being sent to the dial tone generator 44 and the mode control 45. The mode control 45 selects the dialing number 46 and then sends out the station identification number 47, through the output circuit 48 onto the telephone lines to the data center. In a preferred embodiment, the mode control 45 waits for an acknowledge signal from the data center before sending the station identification number. If acknowledgement does not come within a specified time, the mode control 45 switches to an alternate preselected dialing number 50.

The data information from the pulse width discriminator is sent to the data storage and shift control 51 and then, when signaled from the mode control unit 45 sends the data to the output circuit 48 and onto the telephone lines to the data center.

The operation of FIG. 4 will now be described. The information received from the transmitter consists of an initial turn-on pulse, followed by a number of data pulses. The demodulator 40 removes the RF carrier and routes the envelope to the pulse width discriminator 41. The pulse-width discriminator routes a pulse on line 52 to the clock generator 42. The pulse is sent to circuit 43 which determines whether the pulse is a turn-on pulse or data pulse. As will be explained hereinafter, the turn-on pulse is a very narrow pulse of 100 microseconds while the data pulses vary in width between 0.01 seconds and 0.1 seconds. The discriminator converts the pulse width into a digital value.

The turn-on signal is sent on line 53 to the dial tone generator 44 and to the mode control 45. The dial tone generator is electronically connected to a standard telephone unit. It disconnects the handset from the telephone and places the CRR onto the telephone line. The mode control 45 then addresses the preselected dialing number 46 to call the data center. In a preferred embodiment, it awaits acknowledgement on line 49 from the data center indicating that the CRR is in communication with the data center. If the first dialing number 46 is busy, or if the number has not been completed due to faulty switching, no acknowledge signal will be received. After waiting a fixed amount of time, the mode control unit 45 will address the alternate preselected dialing number 50. The dialing numbers 46, 50 are placed onto the telephone lines by the output circuit 48 from lines 53, 54 respectively.

After the number has been dialed, the mode control unit 45 addresses the station identification number 47 which sends the identification number onto the telephone lines through output circuit 48. The mode control 45 then addresses the data storage and shift control 51 to have the data from the E-T unit relayed to the data center.

The data pulses which are detected from the pulse width discriminator 41 are stored in the data storage and shift control 51. Since the data pulses follow the turn-on pulse, the data storage is done simultaneously with the electronic dialing of the preselected telephone number. After the entire data has been stored, the pulse width discriminator is locked out to prevent any other data message from entering and destroying the stored data.

After the station identification number has been transmitted, the mode control 45 addresses the data storage and shift control 51 to shift out the data to the output circuit 48 along line 55. The data is then transmitted to the data center on the telephone lines. The lockout signal to the pulse width discriminator 41 is removed and the CRR is ready to receive the next signal from an E-T unit.

Figure 5:
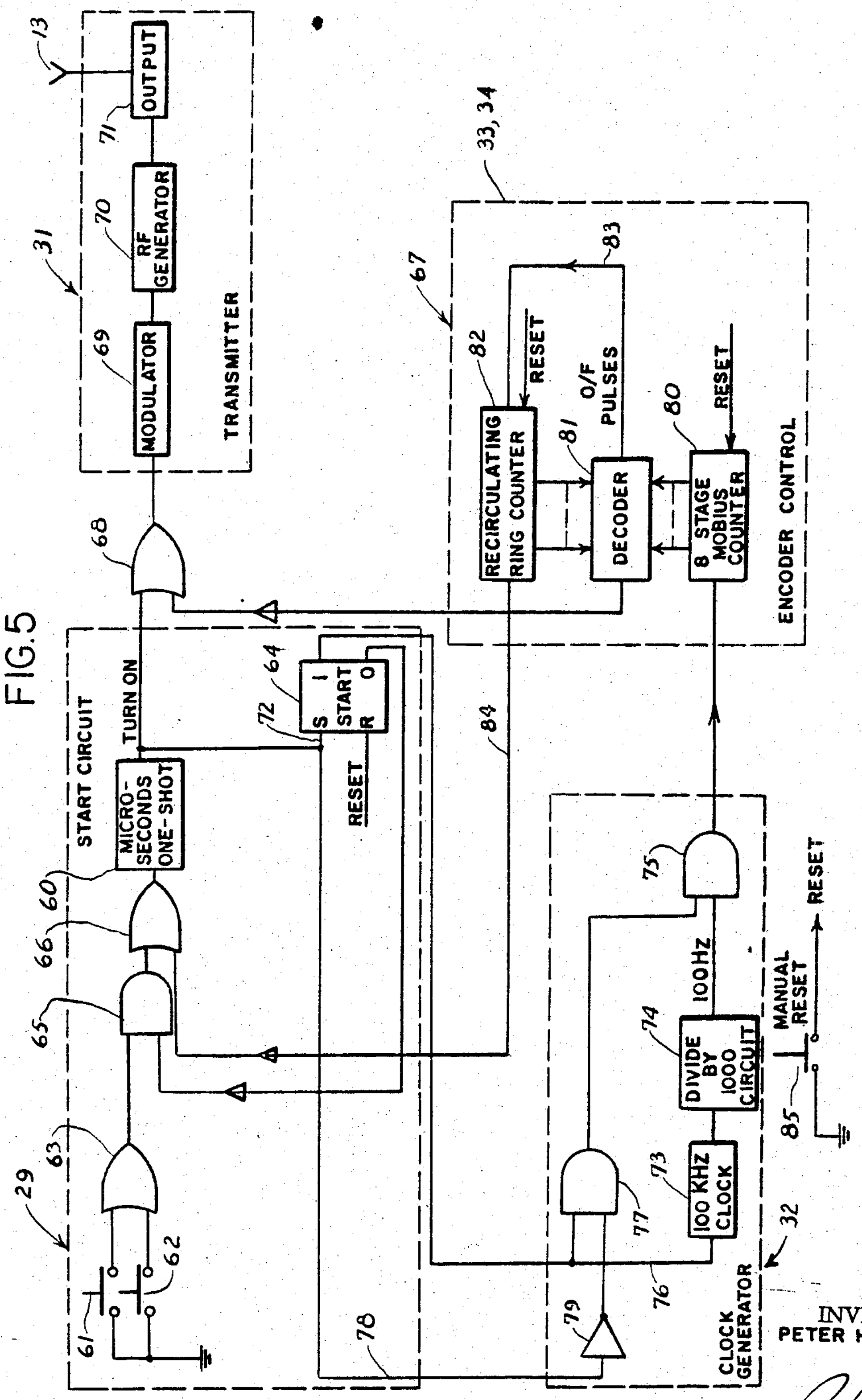
FIG. 5 is a detailed block diagram of a preferred embodiment of the Encoder-Transmitter Unit of FIG. 3.

Referring to FIG. 5 there is shown a detailed circuit of the E-T unit shown generally in FIG. 3 wherein like blocks are similarly identified. The start circuit 29 consists of a 100-microsecond one-shot multivibrator 60 which is triggered by one of the start buttons 61, 62. As heretofore explained, a plurality of start buttons may be placed in parallel to provide inconspicuous accessibility by the user. Two buttons are shown, however, any number could be used. An OR gate 63 combines the possible signals from the start buttons.

The start circuit 29 also includes a start flip flop 64 which produces a "0" output when it is in its initial or reset stage. The "0" output from flip flop 64 is sent to AND 65 as an enabling signal for the start pulse from the start buttons 61, 62. The output from AND gate 65 passes through OR gate 66 to trigger the one-shot. A second input to OR gate 66 comes from the circulating ring counter 67 of the encoder and control unit 33, 34 as will hereinafter be explained. The initial conditions for triggering the one-shot 60 are therefore a "0" output from flip flop 64 and the occurrence of a start pulse from one of the start buttons, or an address signal from the ring counter 67.

The 100 microsecond output pulse from the one-shot 60 is the turn-on signal. It is gated through OR gate 68 to the RF generator and transmitter section 31. This section includes a modulator 69 in series with an RF generator 70 and power output circuit 71 which transmits the signal from antenna 13. The turn-on signal also serves to set the flip flop 64 on line 72. This changes the output from "0" to "1." Because of the absence of a "0" pulse from flip flop 64, AND gate 65 will no longer be enabled and the one-shot 60 will be locked out. Thus, after a start signal, the entire E-T will operate continuously and will not be effected by an further start signals. Only a reset signal will terminate the operation as will hereinafter be described.

The "1" output from flip flop 64 is directed to the clock generator circuit 32. The clock generator 32 comprises a 100 stage Hz oscillator 73, followed by a 81 by 1000 circuit 74 the output of which is a 100 Hz clock pulse, which is directed to the encoder and control unit 33, 34 through AND gate 75. The oscillator 73 is triggered by the "1" output from flip flop 64 on line 76. The "1" output from flip flop 64 also serves as one input to AND gate 77. The second input to AND gate 77 is the turn-on pulse from the one-shot 60 along line 78 which is delayed by delay 79. The output from AND gate 77 is the second input to AND gate 75.

The encoder and control circuits 33, 34 generate the data pulses for the system including the identification number and the emergency code. These circuits consist of an 8 state Mobius counter 80, a decoding network 71 and a recirculating ring counter 82. The ring counter is connected to the external dial network and selects the decoders to be addressed in accordance with the type of emergency selected by the user.

The Mobius counter 80 is controlled by the 100 Hz clock pulses. A data pulse, equivalent in time to the number of clock pulses strobed in is decoded by the decoder 81. The decoder 81 is a set of AND gates and flip flops that decodes the data pulse from the Mobius counter 80. Each number in sequence is selected by the ring counter by addressing the particular set of gates and flip flops associated with that number in the decoder. Each number is selected by the ring counter being incremented by each overflow pulse from the decoder on line 83. The output from the decoder 81 is sent to the transmitter 31 through OR gate 68.

The ring counter 82 has only one state active at a time. In its initial reset state, it addresses the start circuit one-shot multivibrator 60. As the ring counter is incremented, it, in turn, addresses each of the various decoders 81. The ring counter is continuously incremented until it again reaches its initial state at which time it again addresses the one-shot 60 along line 84. This causes the turn-on pulse to again be sent to the transmitter 31 and also triggers gates 77 and 75 to again stroke the Mobius counter since the 100 Hz clock pulses are continuously generated. Thus, once the starter button 61, 62 has been depressed, the E-T will provide continuous transmission of the data sequence including the turn-on pulse, the identification numbers and the emergency code. This sequence will be repeatedly transmitted until the system is manually reset.

A manual momentary reset switch 85 which may be part of the start switch, connected to the E-T unit emits a pulse when triggered. The reset pulse serves to reset the Mobius counter 80, the ring counter 82 and the flip flop 64. This results in ending the data transmission from the encoder 33, and sending the "0" output from flip flop 64 to enable the AND gate 65 to receive the next start pulse. The clock will stop operating and no further information is transmitted.

Transmitter 31 is a low power pulse-modulated RF type transmitter. The frequency of the transmitter can be changed by changing the oscillator 69 frequency.

In operation, the closing of starter button 61, 62 sends a pulse to trigger the one-shot 60 which emits a turn-on signal. This signal is the first signal transmitted through transmitter 31. The turn-on signal also starts the clock generator 32 which after a time delay long enough for the turn-on signal to be transmitted, is then used for strobing the encoder and control circuits 33, 34 which emit data information on the identification number and the emergency code.

Figure 7:
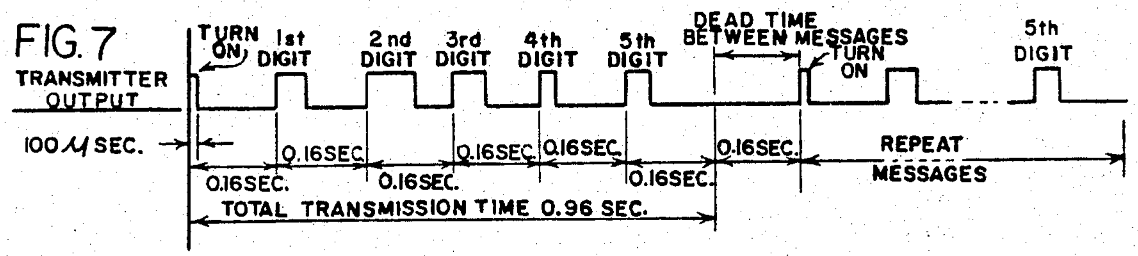
FIG. 7 is a timing diagram of the data transmitted from the Encoder-Transmitter Unit of FIG. 5.

FIG. 7 shows a timing diagram of the data information transmitted from the E-T unit. It is assumed in this example that the information comprises a turn-on signal, a two digit emergency code and a three digit identification number. In the embodiment shown, the total period of each pulse is 0.16 sec thereby providing a total message transmission time of 0.96 sec. The turn-on pulse is a narrow 100 microsecond pulse occurring at the beginning of the message. Each of the five data pulses has its pulse width variable depending on the digit being transmitted. The pulse width can vary between 0.01 seconds to 0.1 seconds. Since the period is fixed by the clock rate at 0.16 seconds, the space between pulses, being the remaining time from the end of the variable width pulse to the beginning of the next pulse, will vary between 0.15 seconds to 0.06 seconds. At the conclusion of one complete message, a dead time of one period (0.16 seconds) exists and the message is repeated again. This continues until interrupted by a reset pulse as hereinbefore explained. It is understood that any number of digits could be used to make up the message merely by increasing the number of stages on the ring counter 82.

Figure 6:
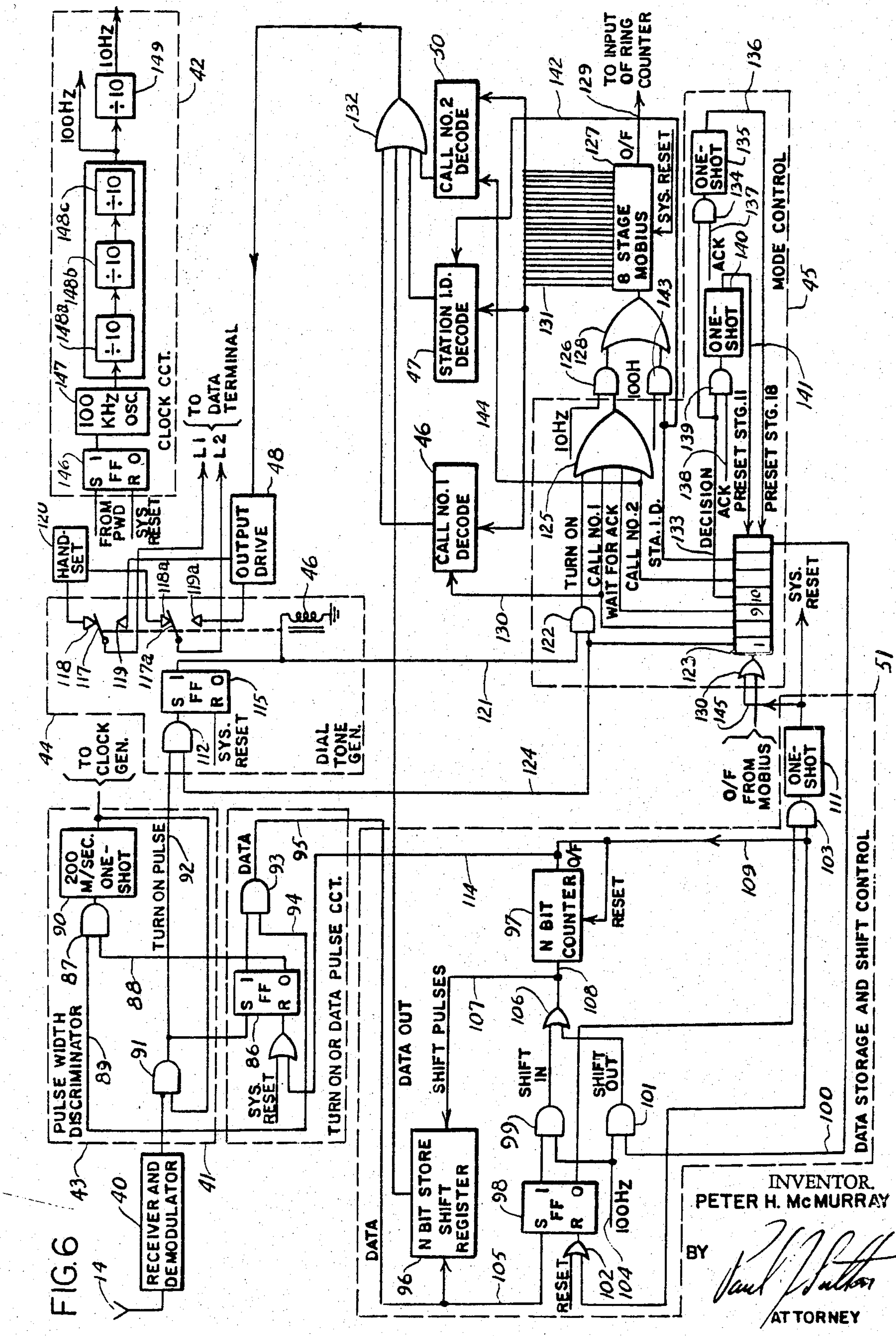
FIG. 6 is a detailed block diagram of a preferred embodiment of the Computer Relay Receiver Unit of FIG. 4.

Referring now to FIG. 6, there is shown a detailed diagram of the CRR circuit shown in FIG. 4 wherein like parts are similarly identified.

The CRR has a receiver and demodulator unit 40 connected to a receiving antenna 14. The receiver is tuned to the transmitting frequency of the E-T output. The demodulator receives the RF modulated pulses from the E-T and removes the RF carrier wave to present the data envelope (as shown in FIG. 7) to the pulse width discriminator unit 41.

The pulse width discriminator serves to convert the pulse width into a specific digital value. Then, circuit 43 determines if the pulse is a turn-on signal or data pulse. The turn-on signal is sent to the dial tone generator 44 and the data pulses are sent to the data storage and shift control unit 51. The pulse width discriminator 41 and the circuit 43 include a flip flop 86 which in its initial or reset state produces a level on the "0" output. This output serves as an enabling level for AND gate 87 along line 88. The second input to AND gate 87 is from the incoming data from the demodulator 40 on line 89. The output from AND gate 87 triggers a 200-microsecond one-shot multivibrator 90.

The 200-microsecond output from one-shot 90 is used as one input to AND gate 91. The second input to AND gate 91 is the absence of a signal from the demodulator 40. The output from AND gate 91 is the turn-on pulse on line 92 which is sent to the dial tone generator 44. The output from the multivibrator 90 is also used to energize the clock circuit Hz.

Figure 8:
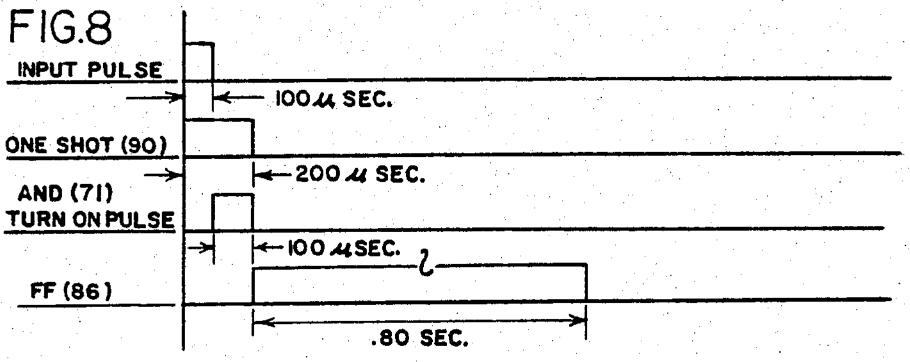
FIGS. 8 and 9 are a pulse timing diagram useful for explanation of the Computer Relay Receiver of FIG. 6.

Referring to FIG. 8 there is shown the pulse sequences in the pulse width discriminator 41. The transmitted turn-on pulse from demodulator 40 to AND 87 is a 100-microsecond pulse. Since the output from flip flop 86 is "0," gate 87 will trigger the one-shot 90 to produce a 200-microsecond pulse as shown. Therefore, at the end of the input pulse, the one-shot output pulse will remain "on" for 100 microseconds longer. This 100-microsecond extra time, together with the absence of the input pulse serve to trigger AND gate 91 which produces the 100-microsecond turn-on pulse for the dial tone generator.

The output from AND gate 91 also sets flip flop 86 thereby disabling AND gate 87 and preventing any further triggering of the one-shot 90. The "1" output from flip flop 86 enables AND gate 93. The other input to AND gate 93 is the data pulses directly from the demodulator 40 on line 94. Thus, the discriminator takes the first input signal and routes it on line 92 as a turn-on signal, and then enables gate 93 to permit all subsequent data pulses to pass into the data storage and shift control 51 on line 95. By providing the additional gate 91, the CRR eliminates the possibility of accidental triggering. Since spurious noise or data pulses are much wider than the 100-microsecond input pulse, no coincidence would occur at gate 91 and no turn-on pulse would be accidentally triggered.

The data storage and shift control unit 51, serves to store the data received from the E-T and, when addressed by the mode control 45, shifts this data onto the telephone lines. The unit 51 comprises a shift register 96 which shifts in the data information under control of shift-in clock pulses, and then subsequently under control of shift-out clock pulses, sends the data information out. A counter 97 determines the number of bits of data to be shifted into the register 96 and emits an overflow pulse when the register 96 has shifted in or out the complete information.

The clock pulse circuit comprises a shift-in arrangement and a shift-out arrangement. The shift-in arrangement has a flip flop 98 and AND gate 99. The shift-out arrangement has an AND gate 101 controlled by an enabling signal from the last stage of the mode control ring counter on line 100 as will hereinafter be explained. Clock pulses from a clock generator 42, to be hereinafter described, enter on line 104.

When the data pulses begin coming into the unit 51 on line 95, these pulses set flip flop 98 on line 105. The "1" output level of flip flop 98 enables AND gate 99.

The clock pulses from line 104 also enter AND gate 99 and pass therethrough to provide shift-in clock pulses. These are passed through OR gate 106 to shift register 96 on line 107 and also increment the counter 97 on line 108.

When the counter 97 reaches the maximum count, an overflow pulse is emitted on line 109. This pulse resets the counter 97 itself so that it can begin its count again, and also resets flip flop 98 through OR gate 102. Resetting of flip flop 98 removes the "1" output level thereby closing AND gate 99 and stopping the shift-in pulses. The overflow pulse from counter 99 is also sent to AND gate 103. However, since flip flop 98 was in a set position, gate 103 is not enabled.

The unit 51 will then wait until the signal on line 100 from the mode control unit 44 indicates that the data should be shifted out. AND gate 101 will be enabled and the clock pulses on line 104 will pass through gate 101 to shift out the data from register 96. The shift out pulses will also pass through OR gate 106 to the counter 97. When the counter 97 overflows for the second time, now indicating that the data has been shifted out, the overflow pulse on line 109 will pass through AND gate 103 which is now enabled from the "0" output of flip flop 98. AND gate 103 enables a one-shot multivibrator 111 which generates a system reset pulse. The reset pulse will only be generated after all the data has been transmitted. The second overflow pulse from the counter 97 arrives only after the dial tone generator has disconnected the handset, the mode control has dialed the selected telephone number and the station identification number has been transmitted onto the telephone lines.

The overflow from counter 97 also serves to reset flip flop 86 on line 114. This prevents any further pulses from entering the data shift register, which, after the proper data information arrives, would be only spurious pulses.

The turn-on pulse on line 92 sets flip flop 115 through AND gate 112 in the dial tone generator 44. The "1" output energizes relay 116 which closes ganged switches 117 and **117*a* from contacts 118, 118*a* to contacts 119 and 119*a*. Normally, a handset 120 from a regular telephone is connected through contacts 118 and 118*a* and switches 117 and 117*a* to the telephone lines L1 and L2. However, when the switches 117 and 117*a* are closed onto contacts 119 and 119*a* the handset is removed from the line and the output drive circuit 48 from the CRR is connected into the telephone lines L1 L2. The "1" output also serves as an enabling level for the mode control unit 45 from line 121**.

The mode control 45 causes the dial tone "time out," the preselected call number one to be dialed, awaits for an acknowledge signal, decides if call number two or the station identification number should be transmitted, and causes the data to be shifted out. The output level on line 121 from the dial tone generator 44 enables AND gate 122 which is addressed by stage 1 of the mode control ring counter 123. Stage 1 also serves as the other input to AND gate 112 along line 124. The output from gate 122 is sent through OR gate 125 to enable AND gate 126. The other input to AND gate 126 is the 10 Hz pulse from the clock generator 42. These clock pulses are routed to the 8 stage Mobius counter 127 through OR gate 128 which generates an overflow pulse on line 129 to update the ring counter 123. Also, output lines are connected from the Mobius counter 127 to the call number decode 46, 50 and station identification decode 47.

As shown in FIG. **6*a*, the ring counter has 21 stages. The initial stage is for the turn-on pulse. The next stages are for the first preselected dial number. Assuming a seven-digit number, stages 2 through 8 step the call 1 decode 46 through its number. Stage 9 is a waiting stage for the acknowledge signal from the data center. Stage 10 is a decision stage to determine if an acknowledge signal has been received. If no acknowledge signal is received, stages 11 through 17 permit the second preselected call number to be sent. After the call has been completed, the station identification number is sent. In this example, a three-digit identification number has been assumed and stages 18 through 20 are assigned for signalling the identification station decode 47. Finally, stage 21 is used to signal the storage and shift control 51** to begin sending out the stored information.

When the ring counter is in stages 2 through 8, the output is sent directly to call decode 46 on line 130. Also, the output passes through OR gate 125 to AND gate 126, which has a 10 Hz clock signal impressed upon it and the output passes OR gate 128 to strobe the Mobius counter 127. Each digit will cause the Mobius counter to overflow on line 129 which passes OR gate 130 to bring the ring counter to its next stage. The Mobius counter also has lines 131 controlling the call decodes 46, 50 and the station identification decode 47. The output from the call decode 46 passes OR gate 132 to the output drive 48 and onto the telephone lines L1 L2.

After the call number has been completed, the ring counter is stepped to stage 9 where it waits for the acknowledge signal. Approximately 1.6 seconds of "-time-out" is waited for a response to arrive from the data center. Stage 10 is then entered permitting a decision to be made. If an acknowledge signal is received on line 137, the decision signal from the ring counter on line 133 will enable AND gate 134 and trigger the one-shot 135 to preset the ring counter to stage 18. The output from stages 18 through 21 will be sent directly to the station identification decode 47 on line 142 and also will enable AND gate 143 to pass the 100 Hz clock pulses from the clock generator 42. The clock pulses from AND 143 pass through OR 128 to strobe the Mobius counter 127. The overflow pulses from line 129 increment the stages of the ring counter 123. The output from the Mobius counter on lines 131 cause the station identification number to pass through OR gate 132, through the output drive 48 to the telephone lines L1, L2.

If no acknowledge is received, the decision signal from the ring counter will pass on line 133 to AND 139 which will trigger the one-shot 140. The ring counter will then be preset to stage 11 on line 141 causing the second preselected number to be sent from call decode 50. The signal from the ring counter stages 11 through 17 is sent directly to the decode 50 on line 144. The signals also pass through the Mobius counter at a 10 Hz rate as described with regard to the first call number.

After the call number and the station identification number have been sent, the Mobius counter will put the ring counter into stage 21. The output on line 100 will then direct the information from the shift register 96 to be sent onto the telephone lines. Following the shift out of the data, the system reset on line 145 passes through OR gate 130 and puts the ring counter back to its first stage again.

In another embodiment, during the "time-out" period, while the system is waiting for an acknowledge signal, the circuit proceeds to send out the identification number and the relayed information. By the time the data is shifted out, the "time-out" should be completed. If by then no acknowledgement is received, the second number is dialed and the entire information shifted out again. With this embodiment, no time is wasted during "time-out." If the first number had been reached, it will have obtained the information that much quicker. If no proper connection had been made, no time was lost since the time period would have expired regardless before the second number was dialed.

The clock circuit 42 generates all the required clocking and shift pulses for the CRR operation. It consists of a highly stable 100 KHz oscillator 147 which is controlled by the "1" output of flip flop 146. The flip flop is set by the one-shot 90. This is followed by a number of divide by 10 circuits **148*a*, 148*b*, 148*c* and 149**. These provide the 100 Hz and 10 Hz pulses which can be used within the CRR.

Figure 9:
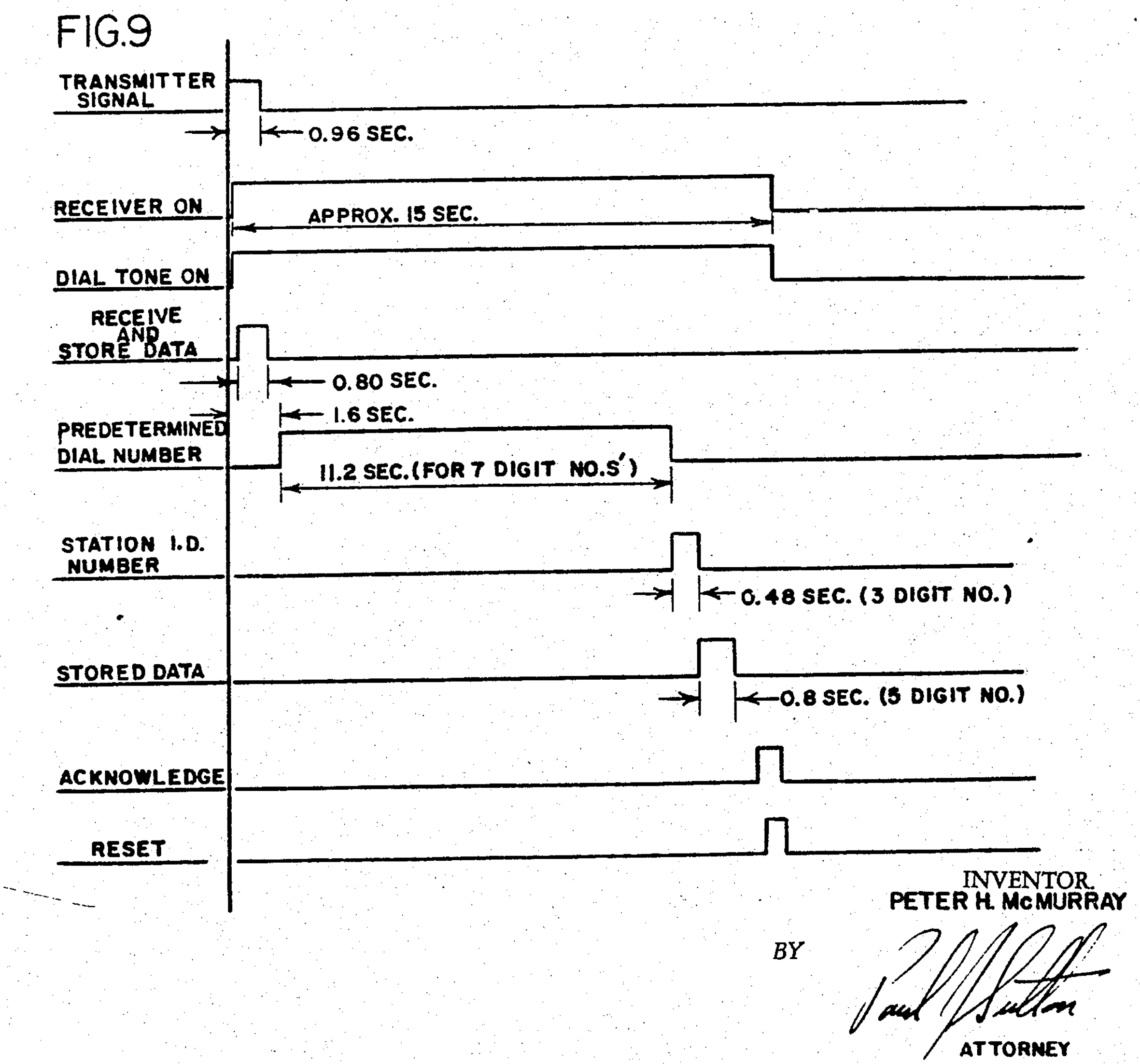

FIG. 9 shows a timing diagram for the CRR of FIG. 6. The signal received from the transmitter is a modulated carrier having a turn-on signal followed by a data signal. Assuming a data word of five digits with a timing as shown in FIG. 7, the total message is 0.96 seconds. The first turn-on pulse of 100 microseconds causes the receiver to turn "on" and remain "on" for approximately 15 seconds. The dial tone generator switch controlled by flip flop 115 similarly remains on for the 15-second interval.

Following the turn-on signal, the data message is stored during an interval of 0.80 seconds. The predetermined dialing number generally has seven digits and requires 11.2 seconds for the number to be electronically dialed. After the dialing is complete, the station identification number is transmitted. Assuming a three-digit station identification code, the time for transmission is 0.48 seconds. Then, the data message previously stored is shifted onto the telephone lines during the next 0.8 seconds. FIG. 9 also shows such an acknowledge signal followed by the reset signal. If the acknowledge signal is not received, the reset would not be generated, the receiver would be left on, the dial tone is left on, the second predetermined number is dialed and all the information is transmitted again.

There has been disclosed heretofore the best embodiment of the invention presently contemplated and it is to be understood that various changes and modifications may be made by those skilled in the art without departing from the scope of the invention.

What is claimed is:

1. A digital communication system for transmitting information from a plurality of terminals to a data center having a telephone input, said system comprising:
   terminal means for encoding a first digital signal including a code identifying said terminal and a message, and for transmitting said first signal, and
   station means connected to a telephone device for receiving said first signal and in response thereto electronically coupling said telephone device to said data center telephone input, and transmitting through said coupling a second digital signal identifying the station and also transmitting said first signal.

2. A system as in claim 1, wherein said message is an encoded representation of an emergency situation.

3. A system as in claim 1, wherein said data center comprises computer means for automatically receiving said first and second signals and dispatching a response thereto.

4. A system as in claim 2, wherein said terminal means comprises switching means for starting said terminal means, selection means for selecting the encoded emergency situation signal to be transmitted, and reset means for terminating the operation of said terminal means.

5. A system as in claim 3, wherein said terminal means once started continues to operate repeatedly transmitting said first signal until reset.

6. A system as in claim 4, wherein said switching means comprises a plurality of switching devices connected in parallel and conveniently located for easy accessibility.

7. A system as in claim 4, wherein said terminal means further comprises a power source for energizing said terminal means, and antenna means for transmitting said first signal.

8. A system as in claim 7, wherein said terminal means is mounted onto a vehicle and said power source and antenna means are part of the vehicle equipment.

9. A system as in claim 1, wherein said terminal means comprises oscillation means for generating an RF signal, modulation means for pulse width modulating said RF signal with said first digital signal, and output means for transmitting said modulated signal.

10. A system as in claim 1, wherein said terminal means comprises:
   switching means for starting said terminal means;
   starting circuit means responsive to said switching means for producing a turn-on pulse;
   clock generation means triggered by said turn-on pulse and producing a continuous number of clock pulses;
   selection means for selecting the message to be transmitted;
   control means encoding said message, providing said identifying code, and outputing said encoded signals when strobed by said clock pulses;
   oscillator means for producing an RF carrier signal; and
   transmission means for receiving said turn-on pulse, said identifying code and said encoded message and modulating these onto said carrier.

11. A system as in claim 1, wherein said station means comprises telephone coupling means which disconnect the handset from said telephone device and electronically dials a predetermined number on the telephone lines, said number being the data center telephone input number.

12. A system as in claim 11, wherein said data center provides an acknowledge signal upon being coupled to said station and said station means further comprises:

timing means, and control means, said timing means being set to count a fixed time interval upon completion of the dialing of said predetermined number and in the absence of said acknowledge signal emitting a pulse upon reaching said fixed time, said control means in response to said last signal triggering said telephone coupling means to electronically dial a second predetermined number on said telephone device.

13. A system as in claim 12, wherein said station means operates to transmit said second signal simultaneously with said timer counting.

14. A system as in claim 1, wherein said electronic coupling is the standard telephone communication medium.

15. A system as in claim 1, wherein said first signal further includes a turn-on signal.

16. A system as in claim 15, wherein said station means comprises decoding means for distringuishing said turn-on signal from the other data of the first signal, means responsive to said turn-on signal for effecting said electronic coupling, encoding said station identification signal, and relaying said other data.

17. A system as in claim 16, wherein said responsive means comprises:

telephone coupling means which disconnects the handset from said telephone device and electronically connects said station onto the telephone lines;

data storage means for receiving said other data;

encoding means for encoding said stations identifying signal, and control means for dialing a preselected telephone number, said number being the data center telephone input number, said control means triggering said encoding means to output said stations identifying signal and triggering said data storage means to output said other data.

18. A system as in claim 1, wherein said station means are selectively distributed throughout a specified area.

19. A system as in claim 16, wherein said station means further includes lockout means which prevent said station means from receiving a further first signal, after receipt of an initial first signal.

20. In combination, a computerized data center and a digital communication system, wherein said data center comprises a telephone input, and said system comprises, terminal means for encoding a first digital signal including a code identifying said terminal and a message, and for transmitting said first signal, and station means connected to a telephone device for receiving said first signal and in response thereto electronically coupling said telephone device to said data center telephone input, and transmitting through said coupling a second digital signal identifying the station and also transmitting said first signal.

* * * * *